(12) United States Patent
Gruijters et al.

(10) Patent No.: US 8,543,335 B2
(45) Date of Patent: Sep. 24, 2013

(54) VALIDATING MAP DATA CORRECTIONS

(75) Inventors: Paulus Gruijters, Eindhoven (NL); Robert Lukassen, Veldhoven (NL)

(73) Assignee: Tomtom International B.V., Amsterdam (NL)

( * ) Notice: Subject to any disclaimer, the term of this patent is extended or adjusted under 35 U.S.C. 154(b) by 342 days.

(21) Appl. No.: 12/736,833

(22) PCT Filed: Oct. 7, 2008

(86) PCT No.: PCT/EP2008/063410
§ 371 (c)(1),
(2), (4) Date: Dec. 20, 2010

(87) PCT Pub. No.: WO2010/040390
PCT Pub. Date: Apr. 15, 2010

(65) Prior Publication Data
US 2011/0112762 A1    May 12, 2011

(51) Int. Cl.
*G01C 21/32* (2006.01)
(52) U.S. Cl.
USPC ........... 701/532; 701/411; 701/418; 701/445; 701/413; 340/993; 340/995.12
(58) Field of Classification Search
USPC ................ 701/411, 413, 431, 418, 409, 445, 701/517, 532; 340/992, 993, 995.12, 995.16
See application file for complete search history.

(56) References Cited

U.S. PATENT DOCUMENTS

| 6,718,258 | B1 | 4/2004 | Barton |
| 2004/0186661 | A1 | 9/2004 | Barton |
| 2008/0046274 | A1 | 2/2008 | Geelen et al. |
| 2008/0059055 | A1 | 3/2008 | Geelen et al. |
| 2008/0065325 | A1 | 3/2008 | Geelen et al. |
| 2008/0082225 | A1 | 4/2008 | Barrett |
| 2008/0177396 | A1* | 7/2008 | Hansen ............................ 700/1 |
| 2008/0177469 | A1 | 7/2008 | Geelen et al. |

FOREIGN PATENT DOCUMENTS

| EP | 1162433 | 12/2001 |
| WO | WO 2008019882 | 2/2008 |

OTHER PUBLICATIONS

International Search Report.

* cited by examiner

*Primary Examiner* — Gertrude Arthur Jeanglaude

(57) ABSTRACT

A system is disclosed for validating a correction to map data for a geographic location, the system including: a processing resource; and a navigation device. In at least one embodiment, the processing resource includes: a user request generator that is configured to generate a user request for transmission to the navigation device; a transmitter for transmitting the generated user request to the navigation device; and a receiver for receiving a user response from the navigation device; and the navigation device includes: a receiver for receiving the user request transmitted from the processing resource; a user request module configured to present the received user request to a user of the navigation device; a user response module for capturing a user response to the presented user request, and a transmitter for transmitting the captured user response to the processing resource.

21 Claims, 12 Drawing Sheets

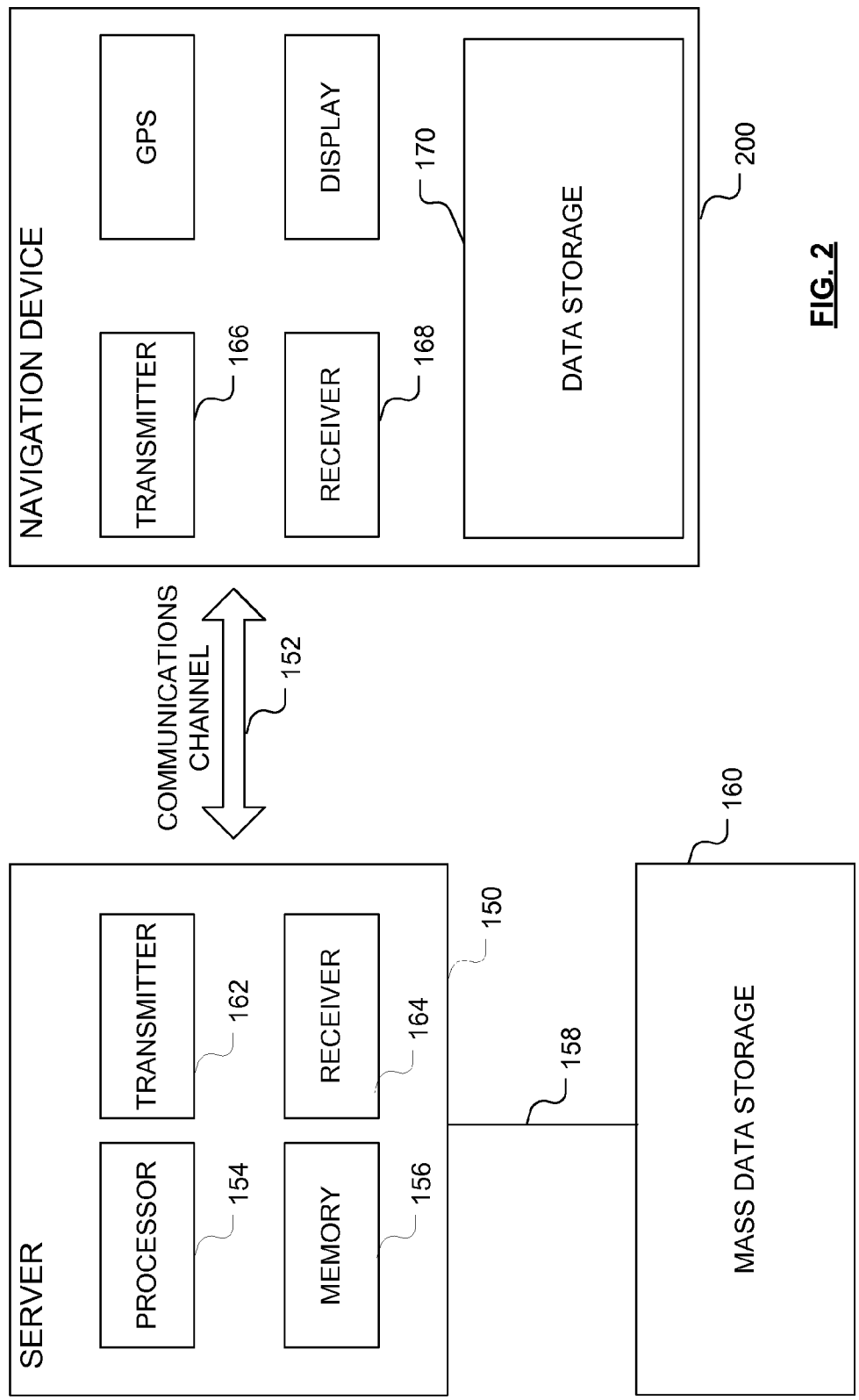

322

324

326

VALIDATING MAP DATA CORRECTIONS

FIELD OF THE INVENTION

The present invention relates, in general, to validating map data corrections. Embodiments of the invention relate to a method for use in the validation of a correction to map data for a geographic location, and to a system for use in the validation of a correction to map data for a geographic location. Other embodiments relate to a navigation device and a processing resource for use in the system, and to a computer program.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems, either as devices that are permanently mounted in the vehicle or as devices that can be removed from the vehicle.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 920T model manufactured and supplied by TomTom International B.V., provide a reliable means for enabling users to navigate from one position to another. Such devices are of great utility when the user is not familiar with the route to the destination to which they are navigating.

As mentioned above, the memory of the PND stores map data used by the PND not only to calculate routes and provide necessary navigation instructions to users, but also to provide visual information to users through the visual display of the PND. As is known in the art, map information can be expressed in a number of ways and indeed can comprise a number of separate information components, which are used in combination by the PND.

Map databases often provide details of road networks for an entire country or even an entire continent, and as such they typically include a vast amount of information. The real road network that is embodied in the map database changes over time, and whilst it is conventional for map providers to provide updates for application to map databases, the rate of change inevitably means that even the most up to date databases include errors that require correction. For example, new roads may be built after a given map has been created, or existing routes may be temporarily or permanently diverted. Furthermore, as the type of information included in these map databases increases, for example to include information regarding points of interest (such as theme parks, museums, banks or filling stations), so the problem of map data accuracy is compounded as new points of interest appear and old points of interest disappear.

Conventionally the accuracy of map data is checked by sending out individuals, typically employees of the map provider, to follow the map and note any inconsistencies or errors they encounter. In some instances users may be provided with the opportunity to participate in the process of map verification by logging errors in the map data that they encounter as they use their devices.

Map Share™, provided by TomTom™, is an illustrative example of such functionality. Users of certain TomTom™ navigation devices can use the Map Share™ functionality to share corrections that they make to the map data stored in their devices with other TomTom™ users who have agreed to be part of the Map Share™ community. Users can choose to receive Map Share™ map data corrections, and can assign a level of trust to indicate whether they are happy to include all received corrections in their map data, or whether they only wish to include officially sanctioned and verified Map Share™ corrections.

Whilst the functionality provided by Map Share™ does help to reduce the incidence of errors in the map data held by those users who sign up to the service, there is a still a degree of verification that needs to be undertaken before officially verified corrections can be released to all users as a map data update from the map provider. This verification process necessarily takes time to complete, and as such if a user wishes to have the most up to date map data available they necessarily need to choose to include map data that has not yet been officially verified.

Whilst most users of functionality such as Map Share™ are seeking to improve the accuracy of the map data for all users, there is unfortunately a significant minority of device users who deliberately seek to introduce errors into the map data by reporting "corrections" that they know to be false. Those users of the Map Share functionality who have opted to trust all corrections submitted by the community can find that these deliberately false "corrections" get imported into their map data, and can be inconvenienced if they should rely on those "corrections" when planning a route.

One solution to this problem would be for the map provider to validate all user submitted corrections before releasing a map update to users, but as aforementioned validation processes are in the first instance relatively expensive to undertake and in the second instance necessarily take time to complete, and whilst such processes are being completed users have no option but to rely on incorrect map data.

It is clear, therefore, that it would be an advantage if processes whereby users can provide information concerning the accuracy of map data can be improved to simultaneously reduce the requirement for validation by the map provider and the likelihood of the map data being affected by false map corrections. One illustrative aim of the present invention is to provide such an arrangement.

SUMMARY OF THE INVENTION

In pursuit of this aim, a first aspect of the present invention provides a system for use in the validation of a correction to map data for a geographic location, the system comprising: a processing resource; and a navigation device; wherein the processing resource comprises: a user request generator that is configured to generate a user request for transmission to the navigation device; a transmitter for transmitting the generated user request to the navigation device; and a receiver for receiving a user response from said navigation device; and the navigation device comprises: a receiver for receiving the user request transmitted from the processing resource; a user request module configured to present said received user request to a user of the navigation device; a user response module for capturing a user response to said presented user request, and a transmitter for transmitting said captured user response to said processing resource.

In one envisaged implementation, the user request includes position information defining one or more geographic locations at which said user request module presents said user request to said user.

The navigation device may include a navigation module configured to determine the geographic position of the navigation device, and said user request module may configured to present said user request to the user when said navigation module indicates that the geographic location of said navigation device is included in said position information.

In an illustrative implementation, the position information defines a zone that is a predetermined distance from the location associated with said geographic location. In another implementation, the predetermined distance may vary in accordance with the type of correction that is to be validated.

The user request generator may be configured to generate a plurality of user requests, each for transmission to a different navigation device.

The processing resource may comprise a device selection module operable to select navigation devices to which generated user requests are to be transmitted.

The processing resource may comprise a route log configured to store navigation routes traveled by navigation devices.

The device selection module may be configured to select a set of devices for which a route is stored in said route log that includes a location in the vicinity of the geographic location associated with said correction.

The device selection module may be configured to select a set of devices for which a route is stored in said route log that includes the geographic location associated with said correction.

In a preferred arrangement, the device selection module may be configured to randomly select a set of devices from a plurality of devices for each of which a route is stored in said route log that includes a location in the vicinity of the geographic location associated with said correction.

The processing resource comprises a response review module for analysing user responses to validate said correction.

The user request module may be configured to present said user request by playing an audio message to said user. The user request module may, alternatively or additionally, be configured to present said user request by displaying a visual message to said user.

A second aspect of the present invention relates to a method for use in the validation of a correction to map data for a geographic location, the method comprising: generating a user request for transmission from a processing resource to a navigation device, transmitting the generated user request to the navigation device; controlling the navigation device to present the user request to a user of the navigation device; capturing a user response to said presented user request; and transmitting the user response to said processing resource.

The method may further comprise analysing said user response to validate said correction.

A third aspect of the present invention provides a method for use in the validation of a correction to map data for a geographic location, the method comprising: generating a user request for transmission from a processing resource to a navigation device; transmitting the generated user request to the navigation device for presentation of the user request to a user of the navigation device; and receiving from a navigation device a user response to a presented user request.

A fourth aspect of the present invention provides a method for use in the validation of a correction to map data for a geographic location, the method comprising: receiving, at a navigation device, a user request transmitted from a processing resource; controlling the navigation device to present the user request to a user of the device; capturing a user response to said presented request; and transmitting said user response to said processing resource.

A fifth aspect of the present invention provides a computer program comprising one or more computer program modules configured, when executed by a processor resource, to cause the processor resource to implement a method as defined herein. A sixth aspect of the present invention relates to a computer program as described herein, embodied at least in part on a computer readable medium.

A seventh aspect of the present invention provides a processing resource configured for use in a system for use in the validation of a correction to map data for a geographic location, the system comprising a navigation device that includes a receiver for receiving user requests transmitted from the processing resource, a user request module configured to present a received user request to a user of the navigation device; a user response module for capturing a user response to said presented user request, and a transmitter for transmitting said captured user response to said processing resource; the processing resource comprising: a user request generator that is configured to generate a user request for transmission to the navigation device; a transmitter for transmitting the generated user request to the navigation device; and a receiver for receiving the user response from said navigation device.

An eighth aspect of the present invention relates to a navigation device configured for use in a system for use in the validation of a correction to map data for a geographic location, the system comprising a processing resource that includes a user request generator that is configured to generate a user request for transmission to the navigation device; a transmitter for transmitting the generated user request to the navigation device; and a receiver for receiving from said navigation device a user response to a user request presented to a user of said navigation device; the navigation device comprising: a receiver for receiving the user request transmitted from the processing resource; a user request module configured to present said received user request to a user of the navigation device; a user response module for capturing the user response to said presented user request, and a transmitter for transmitting said captured user response to said processing resource.

A nine aspect of the present invention relates to a method for use in the validation of a correction to map data for a geographic location, the method comprising generating a request that solicits a navigation device user response, transmitting said request to a plurality of devices, displaying said request to a plurality of navigation device users, and receiving user responses to said displayed requests.

Advantages of these embodiments are set out hereafter, and further details and features of each of these embodiments are defined in the accompanying dependent claims and elsewhere in the following detailed description.

It is thus possible to provide a powerful means for validating requested corrections to map data in a navigation system. The arrangements disclosed avoid much of the expense associated with traditional methods of validating correction requests, and facilitate a quicker respond to noted errors. Furthermore, in preferred embodiments of the invention it is significantly harder for nefarious individuals to pollute the map data with incorrect submissions.

BRIEF DESCRIPTION OF THE DRAWINGS

Illustrative embodiments of the invention will now be described, by way of example only, with reference to the accompanying drawings, in which:

FIG. 2 is a schematic diagram of a communications system that may be employed to provide for communication between a navigation device and a server;

DETAILED DESCRIPTION OF PREFERRED EMBODIMENTS

Figure 1:
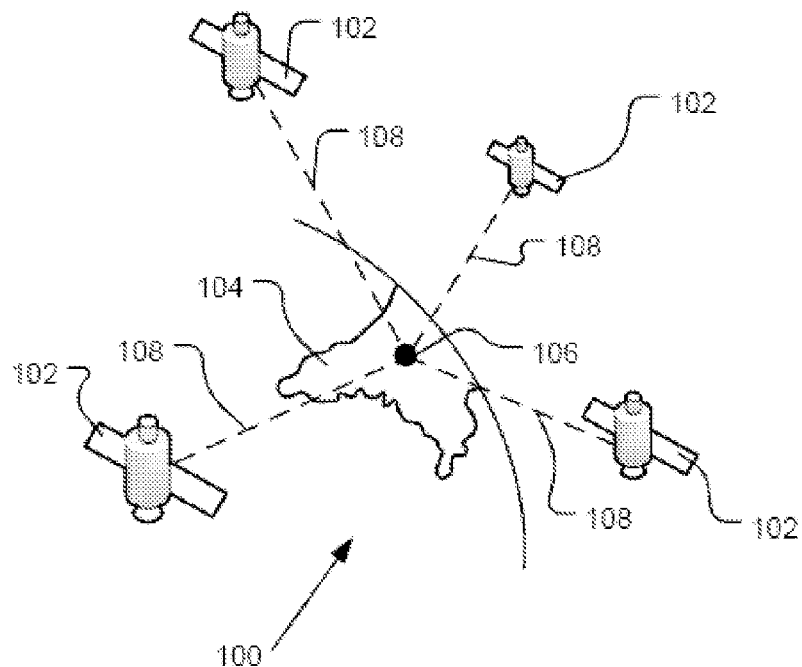
FIG. 1 is a schematic illustration of an illustrative part of a Global Positioning System (GPS) usable by a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device that is configured to execute navigation software so as to provide route planning and/or navigation functionality. It follows therefore that in the context of the present application, a navigation device is intended to include (without limitation) any type of route planning and navigation device, irrespective of whether that device comprises a PND, a device in a vehicle such as an automobile, or indeed a computing resource, for example a personal computer (PC) (portable or otherwise), a mobile telephone or a Personal Digital Assistant (PDA) executing route planning and navigation software.

It will also be apparent from the following that the teachings of the present invention are not limited solely to circumstances where users are following a computed route from an input start location to an input destination location, but are equally as useful when the user is using the device in the aforementioned free-driving mode.

With the above provisos in mind, reference will now be made to FIG. 1 of the accompanying drawings in which an illustrative satellite navigation system, in this instance, the Global Positioning System (GPS) is shown. In general, the GPS is a satellite-radio based navigation system that provides the possibility of continuously determining position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing known geometric triangulation techniques, the receiver utilizes the three known positions to determine its own two-dimensional position relative to the satellites. Additionally, by acquiring a fourth satellite signal the receiving device can calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Turning to FIG. 2, a navigation device 200 comprising or coupled to the GPS receiver device 106, is capable of establishing a data session, if required, with network hardware of a "mobile" or telecommunications network via a mobile device (not shown), for example a mobile telephone, PDA, and/or any device with mobile telephony or communications functionality, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2.

The navigation device includes a data storage device 170 (which may comprise any combination of ROM, RAM and disk based or solid state storage device) as well as other hardware and/or functional parts, which will be described later herein in further detail.

Software stored in server memory 156 provides instructions for the processor 154 and allows the server 150 to provide services to the navigation device 200. In one configuration a service provided by the server 150 may involve processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an internet connection between the server 150 and the navigation device 200.

In general terms the server comprises a processing resource, comprising any number and type of processing devices (linked together or separate), remote from the navigation device 200 and with which the navigation device can communicate by means or a wired or wireless communications channel.

The navigation device 200 may be provided with information from the server 150 via information downloads which may be periodically updated automatically or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
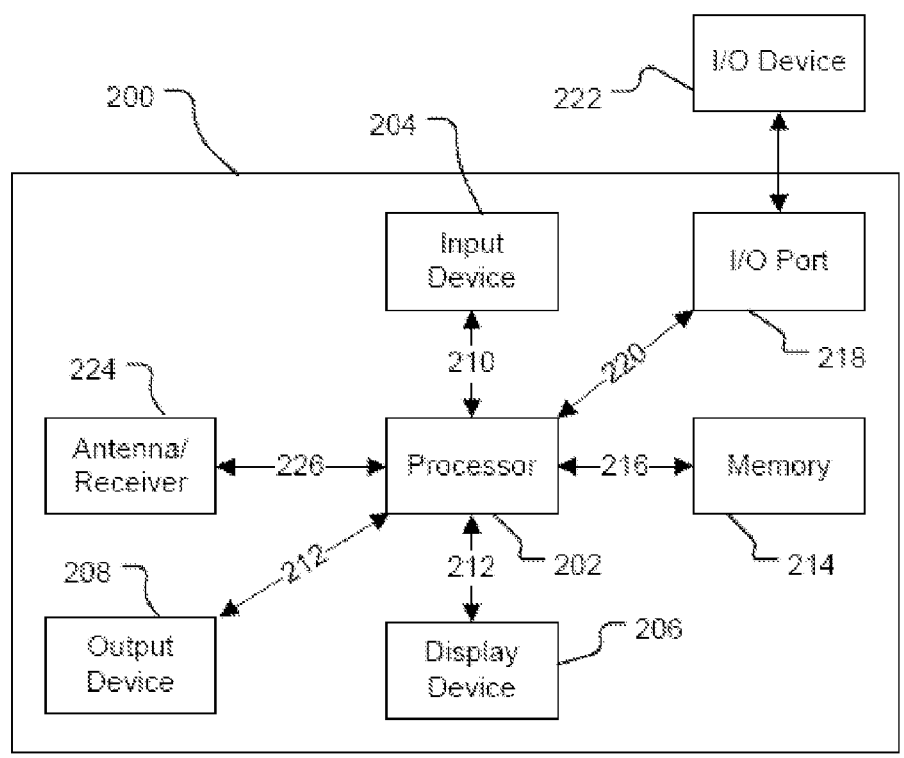
FIG. 3 is a schematic illustration of electronic components of an illustrative navigation device, for example the device of FIG. 2.

Referring to FIG. 3, it should be noted that the block diagram of the navigation device 200 is not inclusive of all components of the navigation device, but is only representative of many example components. The navigation device 200 is located within a housing (not shown). The navigation device 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 (which may comprise any combination of ROM, RAM, disk drive or solid state storage devices, and may be part of the aforementioned data storage device 170) via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
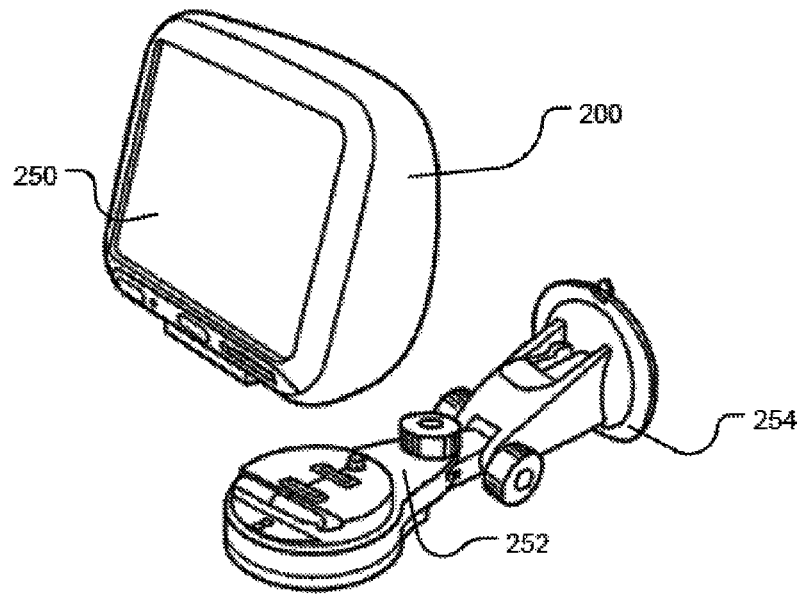
FIG. 4 is a schematic diagram of an arrangement for mounting and/or docking a navigation device.

Referring to FIG. 4, the navigation device 200 may be a unit that includes the integrated input and display device 206 and the other components of FIG. 2 (including, but not limited to, the internal GPS receiver 224, the microprocessor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
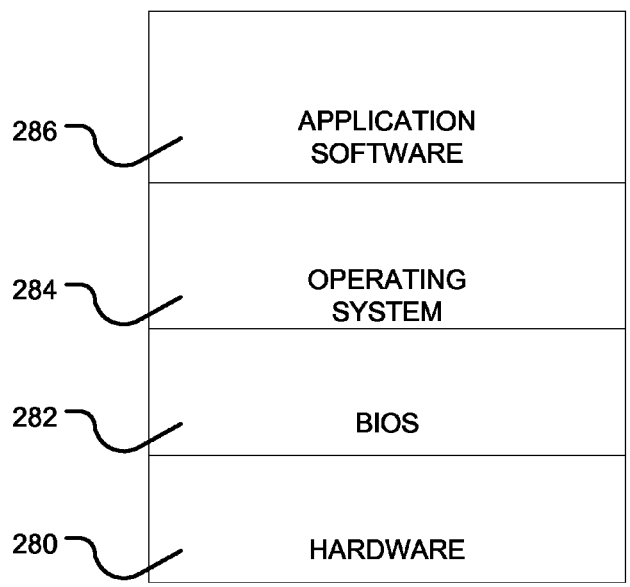
FIG. 5 is a schematic representation of an architectural stack employed by the navigation device of FIG. 3.

Referring to FIG. 5, the processor 202 and memory 214 of the navigation device cooperate to support a BIOS (Basic Input/Output System) 282 that functions as an interface between functional hardware components 280 of the navigation device 200 and software executed by the device. The processor 202 is configured to load an operating system 284 from the memory 214, and the operating system provides a processing environment in which application software 286 (implementing some or all of the route planning, navigation and other functionality described herein) can run. The application software 286 provides an operational environment including a GUI that supports core functions of the navigation device, for example map viewing, route planning, navigation functions and other functions associated therewith.

Details of preferred embodiments of the present invention will now be described with particular reference to a system, such as Map Share™, whereby users can choose to provide feedback to the map provider (who may or may not be the same entity from whom users source navigation devices) concerning corrections that might be appropriate for application to the digital map data held by the map provider. Whilst the following detailed description will make particular reference to Map Share™ it will be appreciated that the present invention is applicable to any user feedback system for navigation map data, and as such the scope of the present invention should not be interpreted as being limited solely for application to the TomTom Map Share™ system.

Figure 6:
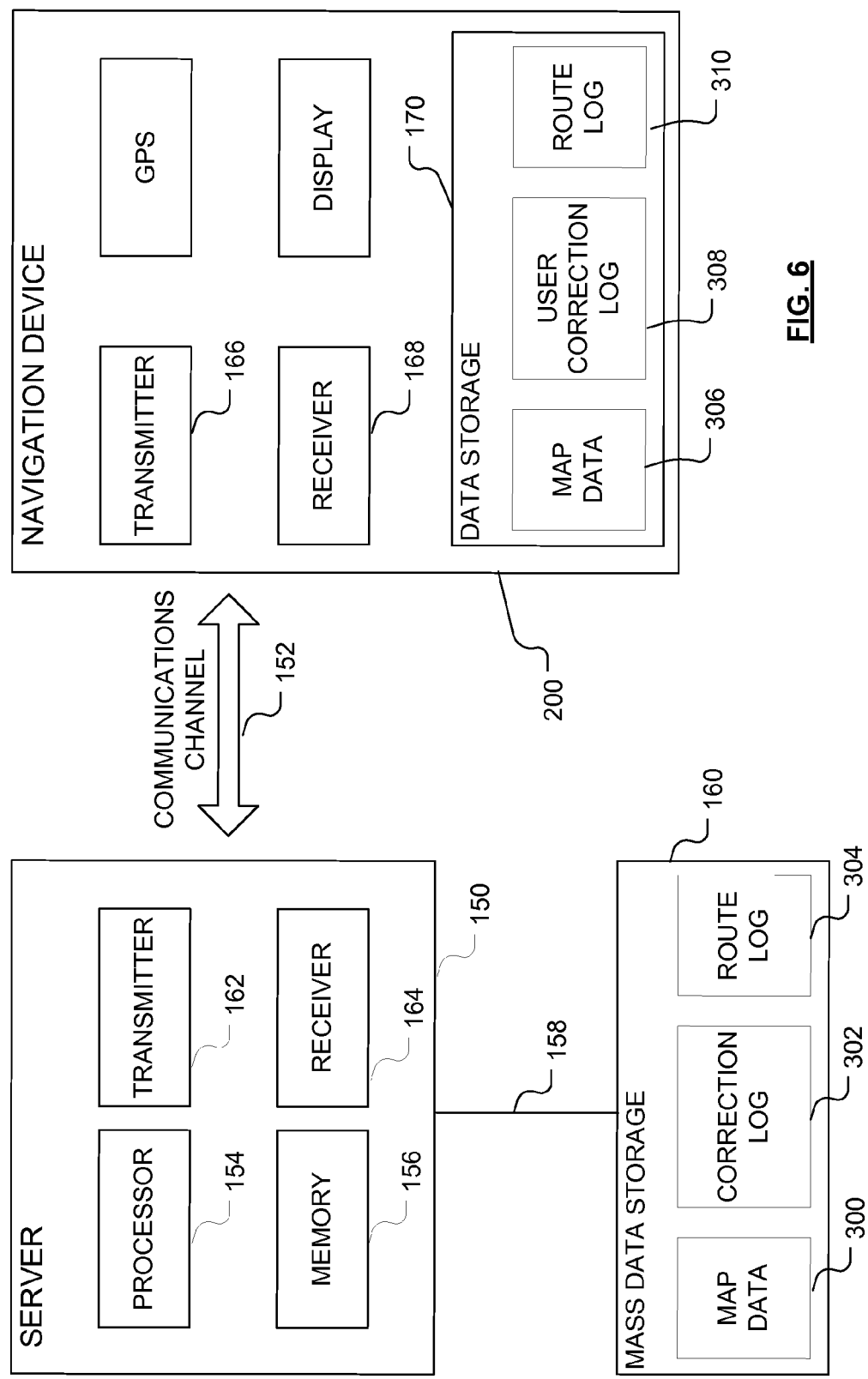
FIG. 6 is a more detailed view of the arrangement shown in FIG. 2.

Referring now to FIG. 6, in a preferred embodiment of the present invention the mass data storage 160 of the server 150 is configured to include a map data store 300, a correction log 302 and a route log 304. Similarly, data storage 170 of the navigation device 200 includes a map data store 306, a user correction log 308 and a route log 310. Although not shown in FIG. 6, the server 150 also maintains a log of those user devices that have opted in to the user feedback system.

The map data stores 300, 306 include digital map data that is used by navigation devices, in a known manner, to provide users with the ability to navigate between locations in the map and to provide rendered maps for display to users. The server-side correction log 302 includes details of map correction requests submitted by users for incorporation into the digital map defined by the digital data held in the map data store 300 if it is appropriate to do so, and the server-side route log 304 includes data concerning the routes traveled by navigation device users who have subscribed to the navigation data improvement system. Typically the server-side route log 304 includes, for each route store, data defining the route traveled as well as an identifier that uniquely identifies the navigation device used whilst that route was being traveled.

The user correction log 308 comprises a database of instances where the user has indicated that a map data correction is required and the type of correction that the user believes should be made. As will be appreciated by persons skilled in the art, such a list can be compiled in a number of different ways, one of which will later be described. Depending on the type of connection between the navigation device 200 and server 150, data from the user correction log 308 can be transferred to the server 150 whilst the navigation device is still mobile, or in a particularly preferred implementation the log can be transferred to the server when the navigation device is next connected to the server for updating.

The route log 310 comprises a database of routes traveled by the user's navigation device 200; typically only the routes traveled since the last time the navigation device was connected to the server. The database includes details of those routes where the device was operated to guide the user to a selected destination, and may also include details of routes traveled whist in free-driving mode.

In the course of a data communications session with the server 150, map data updates (if any are available) are provided from the server-side map data store 300 to the navigation device 200 for storage in the navigation device map data store 306, and data from the user correction log 308 and route log 310 (if any is stored) is transferred from the navigation device 200 to the server 150 for storage in the correction log 302 and route log, respectively.

Figure 7:
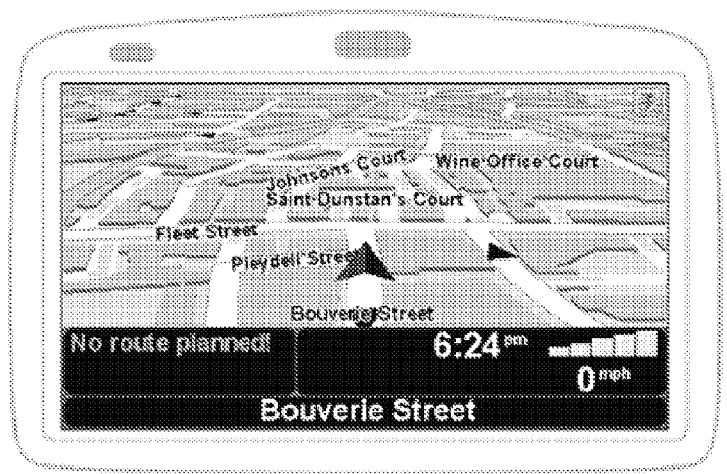
FIGS. 7 to 18 are screenshots of an illustrative map data error reporting process.
Figure 8:
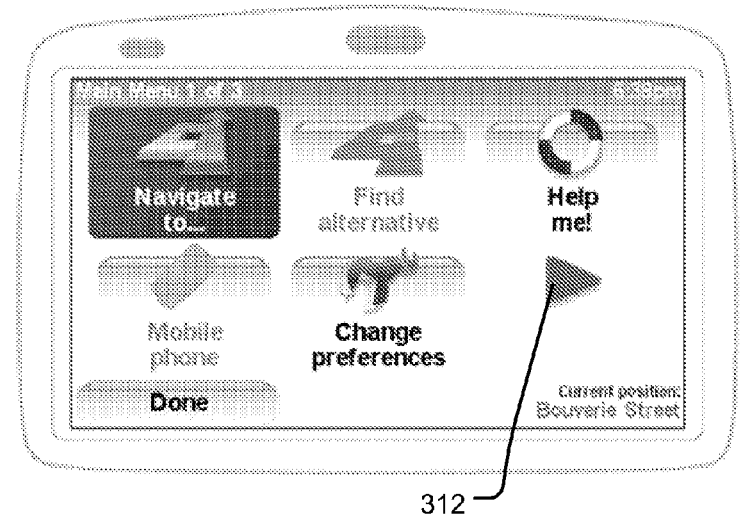
Figure 9:
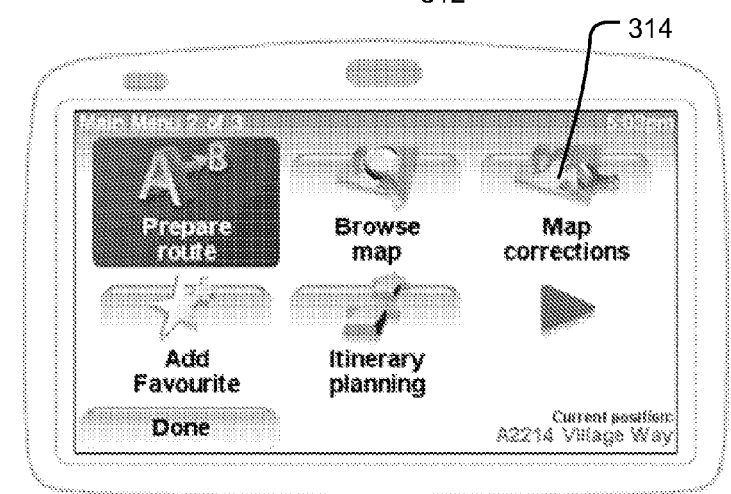

Referring now to FIGS. 7 to 18, there are shown various screenshots from a TomTom™ Go 720 navigation device which illustrate one way in which a user of a navigation device can log a correction that they believe needs to be made to the navigation data, in this instance the navigation data stored in their device In FIG. 7, the device is displaying a map of the area of London surrounding Bouverie Street. Touching the screen of the device causes it to display a number of options, as shown in FIG. 8, and a continuation arrow 312. Touching the continuation arrow 312 causes the device to display, as shown in FIG. 9, another series of options that include a virtual button 314 labelled "map corrections".

Figure 10:
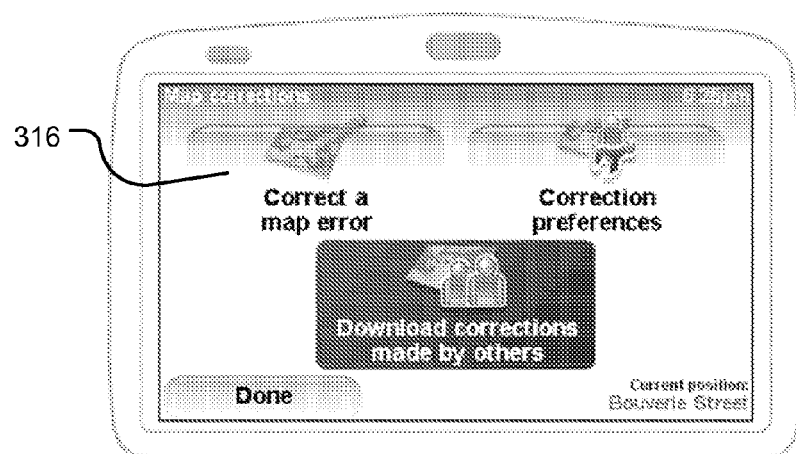
Figure 11:
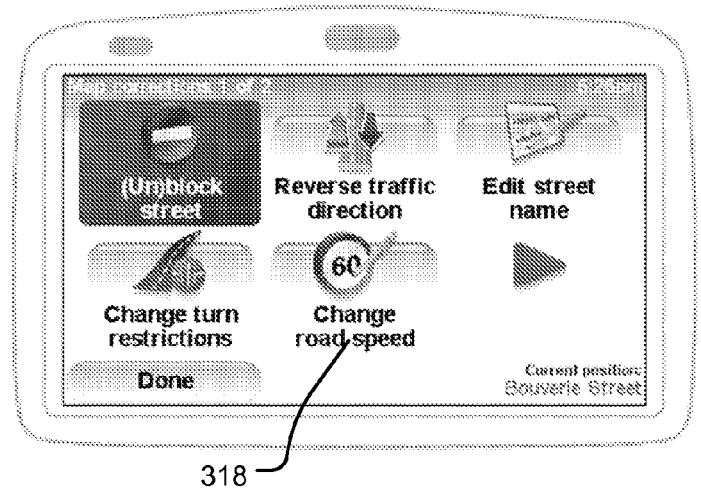

Touching the "map corrections" button 314 causes the device to display the map corrections options shown in FIG. 10, which options include a virtual button 316 labelled "correct a map error". Touching this button 316 causes the device to display, as shown in FIG. 11, a number of virtual buttons that each correspond to a different type of map correction. In total the TomTom Go 720 provides seven predefined types of correction (only five of which are shown in FIG. 11) and a "report other error" which allows users to select types of error other than the seven predefined error types.

In this instance we imagine that the user wishes to correct a speed limit that is associated with a road of the digital map, and to implement this the user touches a virtual button 318 labelled "change road speed", whereupon the device displays four different options, as shown in FIG. 11, for locating the road in question.

Figure 12:
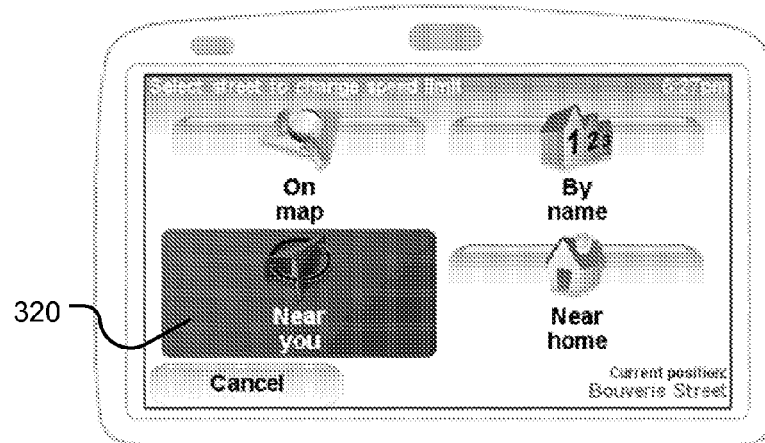
Figure 13:
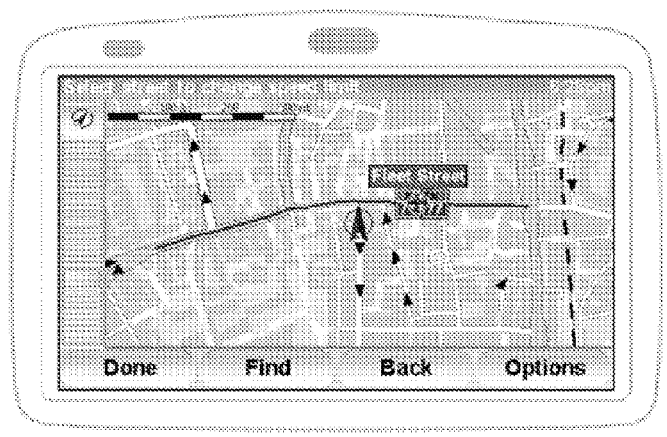

Let us assume in this example that the incorrect speed limit is associated with the road in the vicinity of the device's current location, namely Bouverie Street, London. Touching a virtual button 320 labelled "near you" causes the device to display a map of the local area as shown in FIG. 12. The user can then select the street in the local area (in this example: Fleet Street) that requires correction of the speed limit associated with it by touching the screen and once selected, as shown in FIG. 13, at least part of the chosen road is highlighted and the name of the road is displayed.

Figure 14:
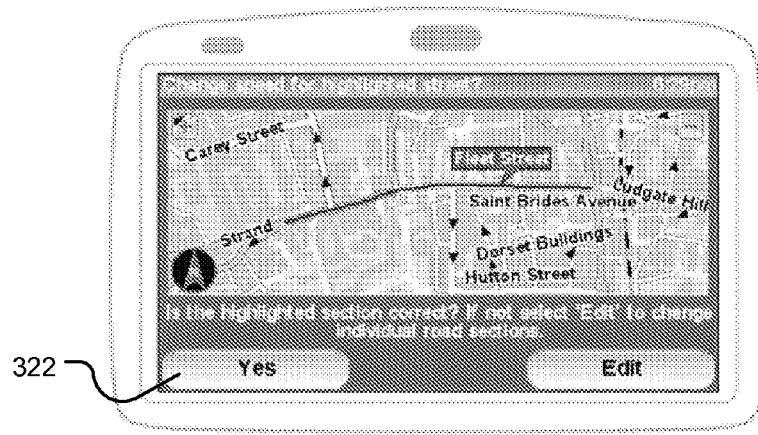
Figure 15:
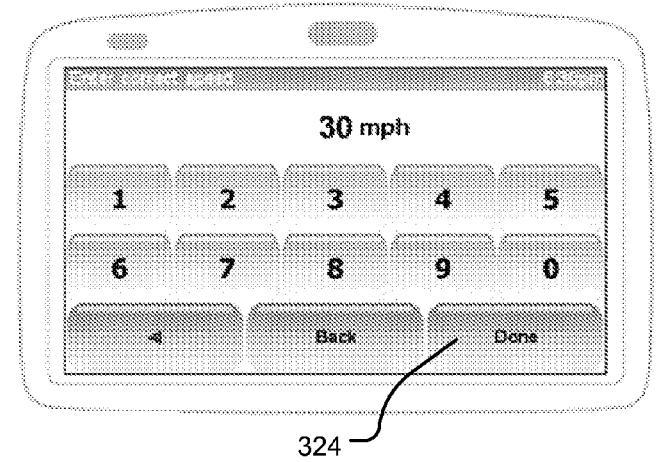

The user is then asked to confirm, as shown in FIG. 14, whether the highlighted part of the road is the part that the user intended to select, and on touching the virtual button 322 labelled "Yes" the device generates the display indicated in FIG. 15 and the user is asked to enter the correct speed limit for the section of road selected in FIG. 14. In this instance the user has indicated that the correct speed limit for this section of road is 30 miles per hour.

Figure 16:
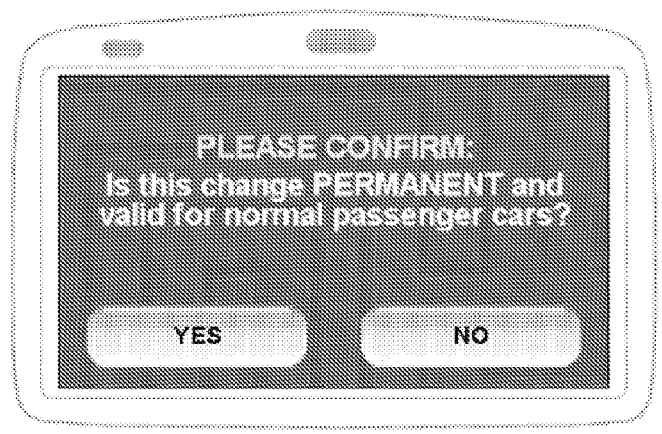
Figure 17:
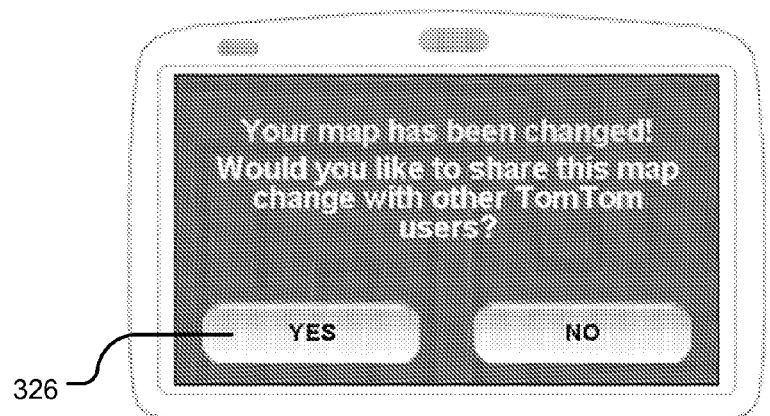
Figure 18:
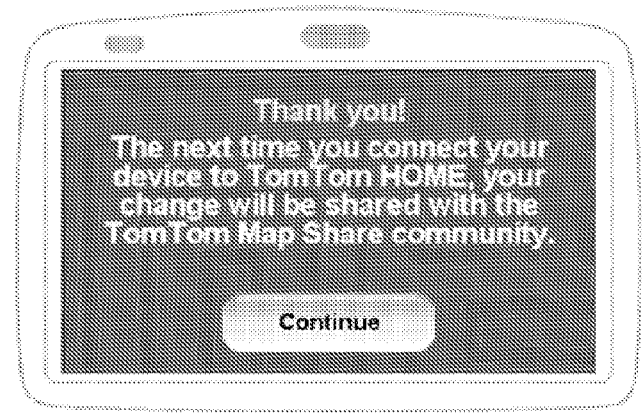

When the user has input the correct speed limit, selecting virtual button 324 labelled "done" causes the device to generate a display as shown in FIG. 16 which requests the user to confirm that the change is "permanent and valid for normal passenger cars" (we assume it is in this example), following which the user is advised by way of the display shown in FIG. 17 that their map has been changed and is prompted to indicate by touching the appropriate virtual button whether they wish to share this change with other TomTom users. If the user touches the virtual button 326 marked "yes" the location of the correction, the nature of the correction and, in this case, the new data associated with that location are stored in the user correction log 308 for download to the correction log 302 of the server 150 when the device is next in communication with the server, and the user is advised accordingly as shown in FIG. 18.

Figure 19:
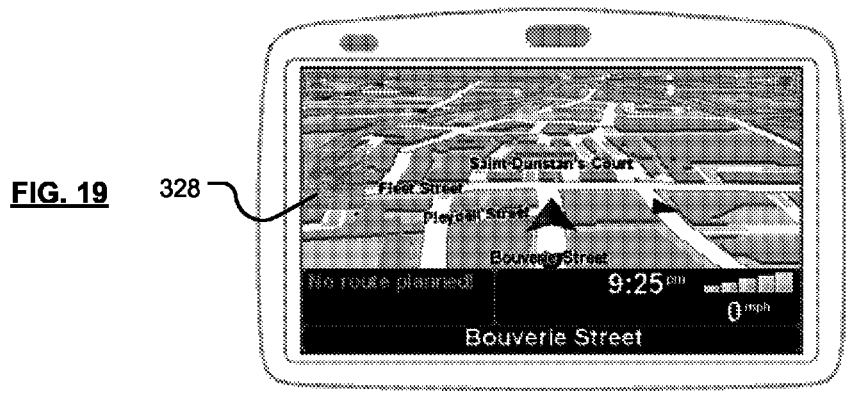
FIGS. 19 and 20 are screenshots of an illustrative location marking process.
Figure 20:
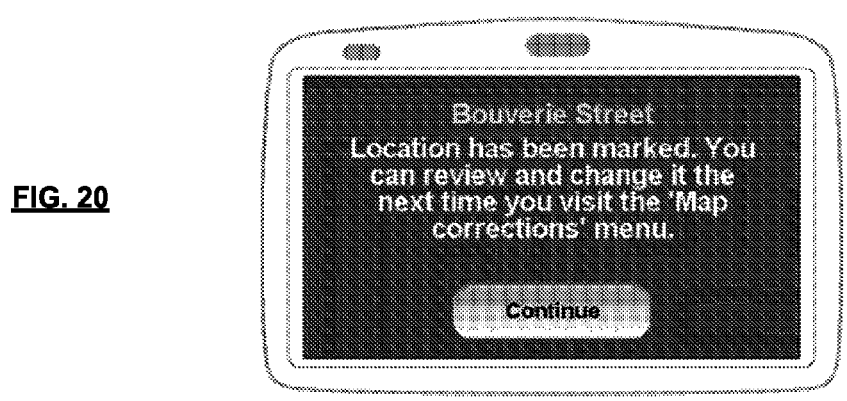

As will be appreciated, this process is quite involved and as such may be involved to be undertaken whilst the device is being used, particularly if the device is being used for navigation in a vehicle. To accommodate this, the software provides the user with the option to overlay the displayed navigation map, as shown in FIG. 19, with a virtual "report" button 324, and if the user should press this button the device provides a display as shown in FIG. 20 to indicate to the user that the location where the report button was pressed has been logged so that the process depicted in FIGS. 7 to 18 can be undertaken at a more convenient time when the user next presses the "map corrections" button 314 shown in FIG. 9.

Figure 21:
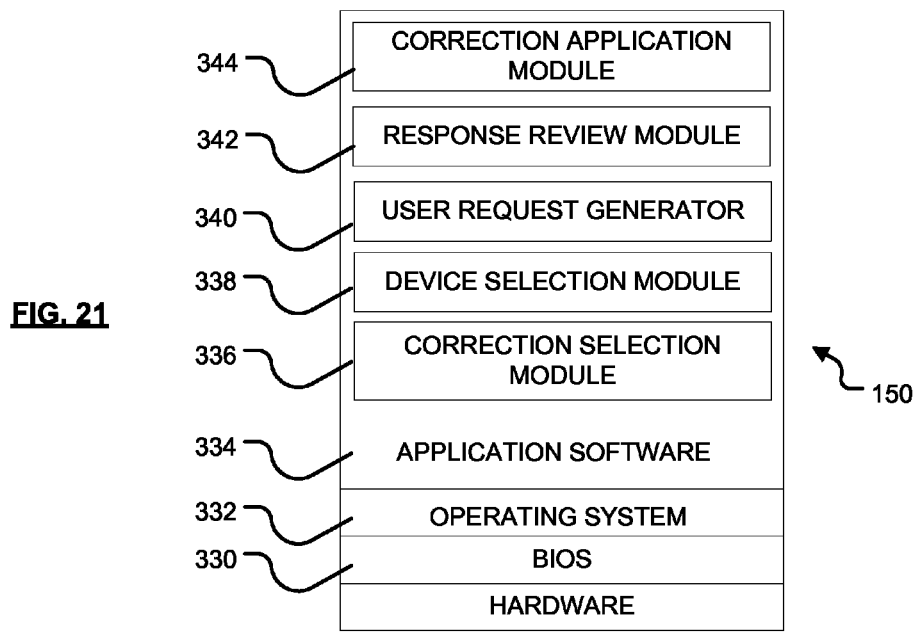
FIG. 21 is a more detailed schematic representation of an architectural stack employed by the server of FIG. 6.

As aforementioned the server processor is configured to invoke and execute software modules in server memory 156. In particular, as shown in FIG. 21, the processor 154 and memory 156 cooperate to support a BIOS (Basic Input/Output System) 330 that functions as an interface between functional hardware components of the server 150 and software executed by the server 150. The processor 154 is configured to load an operating system 332, for example from the memory 156, for execution in the processing environment provided by the memory 156. The operating system 332 provides a processing environment in which application software 334 can run.

In a preferred embodiment of the present invention the server application software 334 comprises a correction selection module 336, a device selection module 338, a user request generator 340, a response review module 342 and a correction application module 344.

The correction selection module 336 is configured to select notified corrections and associated locations from the correction log 302 for validation by navigation device users. The module may select notified corrections in turn (starting with the oldest notified errors first), at random, or once multiple users (for example, more users than a predetermined minimum number of users) have reported a particular problem.

In one envisaged arrangement the server may be configured to implement a correction log maintenance module (not shown in FIG. 21) that is configured to review the correction log and exclude from consideration for user validation those corrections that have been requested by only a small number of users or on a small number of occasions. These corrections are likely to be relatively minor in nature or to relate to relative obscure locations that are unlikely to be visited by many users, and as such may be more appropriate for validation by an employee, for example, than by means of a user validation process of the type described herein.

The device selection module 338 is configured to inspect the route log 304 and, in one configuration, select devices that have previously traveled routes which include the particular location associated with the correction selected for validation from the correction log 302 by the correction selection module 336.

The device selection process can take a number of different forms. In one configuration, the device selection module 338 may be configured to select the first X devices from the route log that have traveled a route which includes the location associated with the selected correction (where X is a number chosen as the minimum number of user devices that must be selected for a requested correction). In a particularly preferred arrangement the number X may be a function of the number of devices with routes that pass the location. In other words, the number X may be, preferably automatically, dynamically adjusted upwards for locations that have been visited by many devices and downwards for locations that have been visited by a smaller number of devices.

In another arrangement the device selection module 338 may be configured to identify a set of devices which have traveled a route that includes the location associated with the selected correction, and then randomly select from this set a subset of X devices (where, as before, X is a number chosen (optionally dynamically) for the system) that are to be contacted for correction validation purposes. This random selection is particularly preferred as it makes it less likely that a chosen device will be associated with a false correction that has been deliberately submitted to adversely affect the integrity of the map data.

In another arrangement, the device selection module 338 may be configured to identify a set of devices which have traveled a route that includes the location associated with the selected correction, rank the set of devices (for example by the number of times that the device concerned has traveled through the selected location), and then select a subset of X devices (where, as before, X is a number chosen (optionally dynamically) for the system) consisting of the devices that have most frequently visited the location and which are to be contacted for correction validation purposes. As before, the devices selected for inclusion in this subset may be chosen at random from a subset consisting of those devices that have most frequently visited the location in question.

In another envisaged implementation, the device selection module may be configured to select for consideration not only those devices that have actually passed through the location in question, but also those devices that have been in the vicinity of the location in question, for example within a kilometre or less of the location in question. In a particularly preferred arrangement, the device selection module may be configured to dynamically adjust the definition of the "vicinity" for a given location in accordance with the number of routes in the log that actually include the particular location associated with the requested correction. For example, for a correction associated with a particular location that has been visited on many occasions in the past, the device selection module may adjust the definition of the "vicinity" of that location downwards, perhaps to include only those devices for whom routes are recorded that actually include the location in question. Conversely, for a correction associated with a particular location that has been visited on a relatively small number of occasions in the past, the device selection module may adjust the definition of the "vicinity" of that location upwards, perhaps to include those devices for whom routes are recorded that include locations within a given distance (for example a kilometer) of the location associated with the requested correction.

The user request generator 340 is configured to generate, for the particular correction type included in the correction log 302, user requests that each comprise a set of instructions for transfer to each of the navigation devices selected by the device selection module 338. The instructions, when executed by the respective processors 202 of the navigation devices 200 will cause those devices to generate and present to the user of the device a request for user assistance in the validation of a reported map data correction. The user requests, once generated, are stored by the server (for example in the mass data storage 160) for transfer to the navigation devices associated with each generated request on the next occasion that the device communicates with the server 150.

In the preferred embodiment the user request instructions identify to the processors of the navigation devices a location (which may comprise a single location or a zone comprising a plurality of locations a predetermined distance from a location with which the requested correction is associated) with which the user requests are associated, and the processors of the navigation devices are configured to execute the instructions of the user requests only when a position determination module (to be later described) of each navigation device indicates that the navigation device is at or near the location in question. In a particularly preferred arrangement the instructions may be configured to control the processor to present the request to the user at a location which is a predetermined distance before the location associated with the requested correction, and in a modification of this arrangement the predetermined distance may be varied in accordance with the type of correction with which the user is being asked to assist. For example, for a correction relating to a street name, the user may be presented with the request shortly before they enter the street in question (on the rationale that street signs are usually provided at entrances to a street). Alternatively, for a correction relating to speed limits associated with a given street, the user may be presented with the request only once they are actually in the street in question (on the rationale that speed limit signs are usually provided at regular intervals along a street).

In another contemplated implementation that is particularly suitable for use with those locations that are typically visited less often, the user request instructions could be configured to instruct the processor to divert the user from their chosen or current route to the location associated with the correction. For example, a user could be presented with a message asking for assistance with a correction that is associated with a minor street that is not far away from a street along which they are proceeding, and if the user should indicate that they are prepared to assist with the request, the processor could vary the planned route to include the street in question or in the case where the user is using the device in a free driving mode, issue the user with instructions to guide the user from their current position to the location in question, and optionally back to the location they were at before they were diverted.

The user requests provided to the user may take a number of forms. They may comprise visually displayed requests for assistance, audio requests for assistance or, in a particularly preferred arrangement, combinations of audio and visual requests for assistance.

Figure 22:
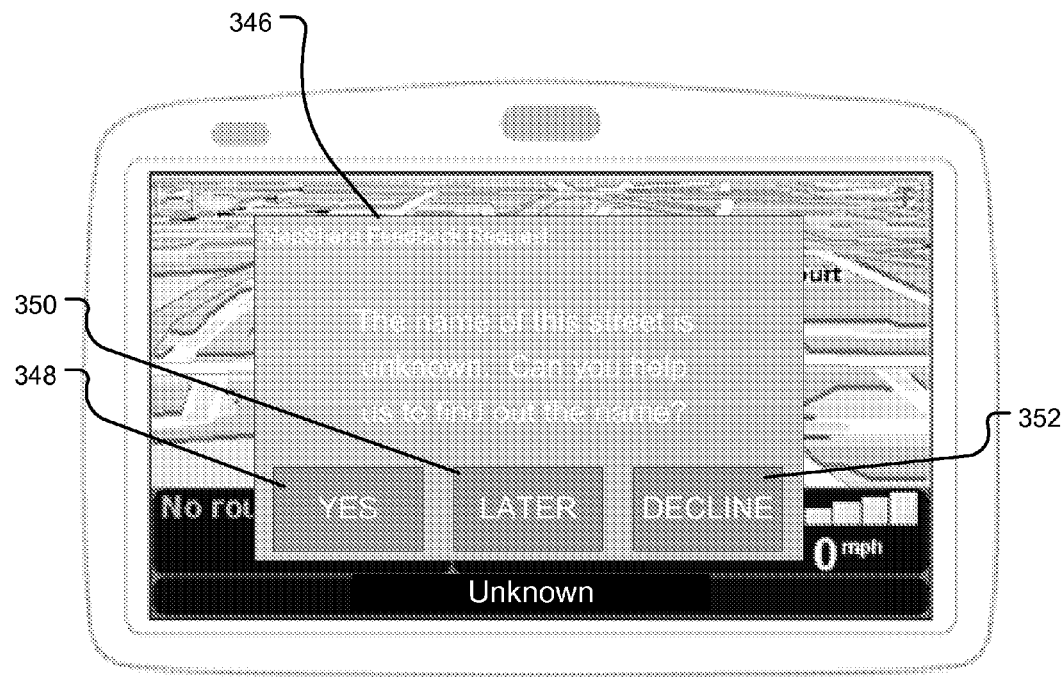
FIGS. 22 and 23 are screenshots depicting an illustrative user request displayed on a navigation device.

FIG. 22 is an illustrative representation for a user feedback request concerning a reporting correction to the name of a particular street. As shown, in this arrangement the display of the navigation device is overlaid with a feedback request 346 that includes a textual message indicating the nature of the problem with the map data at this location (in this instance, the fact that the street name is unknown), and three virtual buttons 348 350 and 352 marked "YES", "LATER" and "DECLINE" respectively. The display of this request may also be announced to the user using audio, for example by replaying audio corresponding to the textual message included in the request 346.

Figure 23:
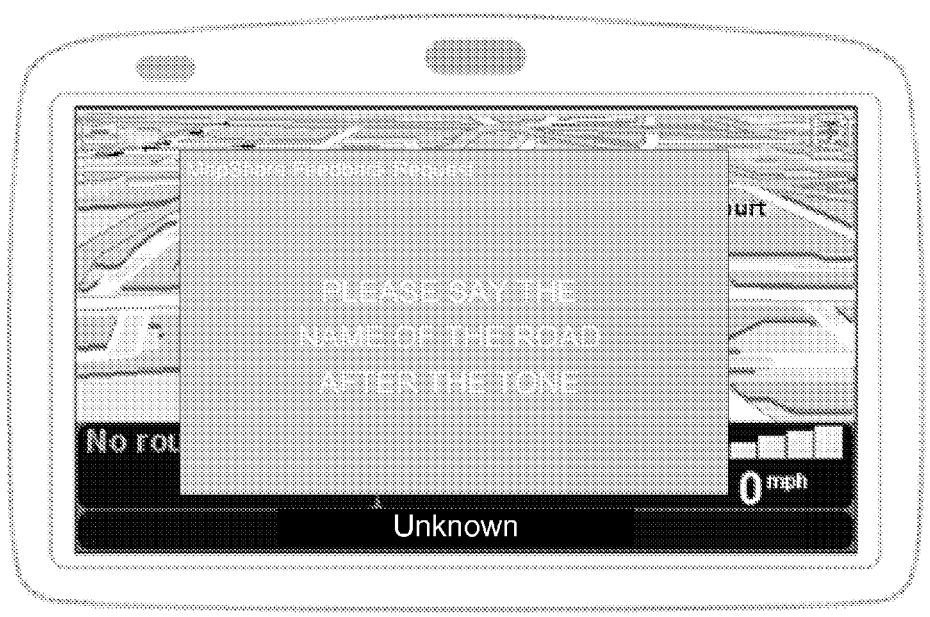

If the user should touch the screen in the vicinity of the "YES" button, the navigation device generates a display such as that shown in FIG. 23 requesting the user, in this instance, to say the name of the road after an audio tone has been played. The display shown in FIG. 23 may, as before, be accompanied by a corresponding audio message to the user of the device, and a short while after the user has been notified the navigation device generates an audio tone and switches to a record mode whereby input device 204 (which in this instance includes a microphone) is activated and audio received via the input device is recorded to the memory 214 of the navigation device for transfer to the server 150 via the communications channel 152 when the navigation device is next in contact with the server 150.

In a preferred arrangement user responses are stored along with information that allows the server to associate the response with a particular requested correction. For example, each requested correction (or group of individual requests that relate to the same error in the map data) could be assigned a reference number that is stored with the user response in the memory 214. In another arrangement, the location associated with the user request could be stored with the user response, and other equally plausible arrangements will be immediately apparent to persons of ordinary skill in the art.

If the user should touch the screen in the vicinity of the "LATER" button 350, the user request is cleared from the display and the processor records an instruction to seek assistance from the user at a later point in time. In an envisaged implementation, a message similar to that shown in FIG. 20 could be displayed, and the user then prompted to provide assistance when they next select the map corrections option shown in FIG. 9.

If the user should touch the screen in the vicinity of the "DECLINE" button 352, the user request is cleared from the display and the processor records that the user has declined to assist with this particular user request. The processor may then be configured to delete the request, or to notify the server 150 when the navigation device is next connected that the user has declined this particular user request. The server could be configured to maintain a log of declined requests and in the event that more than a given number of requests are declined by the user of a particular device, to issue instructions for transfer to the user of that device to cause the processor to indicate to the user of the device that they have declined requests for assistance on multiple occasions in the past, and provide the user with the option to remove their device from the list of devices that the server can approach for assistance with map data corrections.

In another envisaged implementation the user request generated by the processor could provide the user with the option to provide a textual response, or indeed a mix of textual and audio responses.

Referring again to FIG. 21, the server may be configured simply to receive and store user responses for later consideration by a human operator, in particular for consideration whether at least a proportion of the responses are sufficiently similar to merit correction of the map data.

Optionally, however, the server may be configured to employ a response review module 342 that is operable to review received responses to determine whether at least a predetermined proportion of those responses include the same or similar user response. In one envisaged implementation the response review module may be configured to review received responses only when responses have been received from a predetermined proportion of the devices to which user requests were transmitted, and to indicate that a particular response is valid when at least a predetermined proportion of received responses are identical or at least similar. In another arrangement, the response review module may be configured to implement a statistical review of responses received whereby each new response is compared to existing responses until a statistically significant number of responses with the same or similar information have been received.

For textual responses the response review module 342 may simply be configured to compare text of received responses, and to deem a given response to be valid if it is the same or similar to a number of other responses. The degree of similarity that must occur for responses to be deemed to be the same may be automatically adjusted with the type of correction request so that for street names (where typographical errors may occur) a lower level of similarity is required than might be required for speed limits, for example. Once again, such functionality can readily be implemented by persons skilled in the art using known techniques for statistical analysis.

For audio responses, the response review module 342 may be configured to invoke speech analysis functionality to convert received audio into a computer intelligible form before received responses are compared. It is also recognised that a comparison of the received audio could be undertaken, using conventional audio analysis techniques, but it is anticipated that such an approach may prove less useful given different audio qualities of the environments in which the responses are captured and likely differences between users.

In a particularly preferred arrangement, the response review module may also be configured to automatically delete responses relating to corrections that have already been made to the map data. In this way, a response that is late received (for example because the user has not connected their device to the server 150 for a relatively long period of time, or has been tardy in inputting the correction) can readily be ignored by the server 150.

Once received responses have been validated, for example by the response review module aforementioned, the server may optionally invoke a correction application module 344 that is configured to automatically apply a determined correction to the map data stored in the mass storage device 160 of the server 150.

Figure 24:
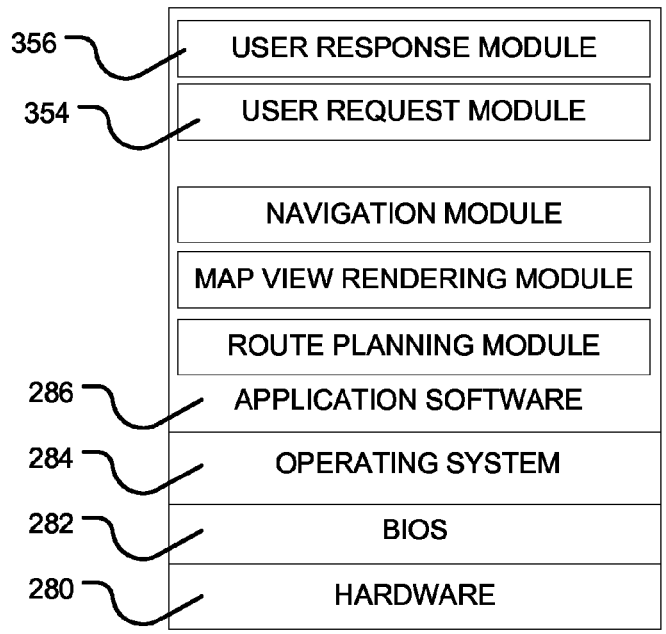
FIG. 24 is a more detailed schematic representation of an architectural stack employed by the navigation device of FIG. 6.

As aforementioned in connection with FIG. 5, the navigation device processor 202 is configured to invoke and execute software modules in memory 214. In particular, as shown in FIG. 24, the processor 202 and memory 214 cooperate to support a BIOS (Basic Input/Output System) 280 that functions as an interface between functional hardware components of the navigation device 200 and software executed by the processor 202. The processor 202 is configured to load an operating system 284 that provides a processing environment in which application software 286 can run.

The application software includes conventional navigation device software modules such as route planning, navigation, and map rendering modules the like of which are well known in the art and for brevity will not be described herein in detail. It suffices to mention that the route planning module enables a user of the device to input a start location and plan a route to an inputted destination, that the navigation module enables the device to receive GPS signals, determine the device location and generate route guidance instructions for provision to the user, and the map view rendering module is configured to generate displays of regions of the digital map, for example a region where the device is currently located as determined by the navigation module.

The application software also includes a user request module 354 and a user response module 356. In this embodiment the user request module 354 is configured to cooperate with the navigation module to invoke, at an appropriate location defined by the user feedback request received from the server, instructions included in the user feedback request to generate an appropriate user feedback request—such as that shown in FIG. 22—for display to the user on the display of the navigation device 200.

The user response module 356, in the manner described above in connection with FIGS. 22 and 23, functions to record that the user does not wish to respond at this time and to configure the navigation device to prompt the user to respond at a later point in time, to record that the user does not wish to respond (and optionally notify the server of this in due course) or to record a user response to the displayed request in the memory 214 for later upload to the server 150.

In the foregoing embodiment it has been assumed that the device is predominately operated in a mobile mode without a connection to the server 150, but it will be apparent to persons skilled in the art that the teachings of the present invention could equally well be implemented in a system where the location, or at least the general location, of each navigation device is known. For example, the navigation device could be configured to periodically transmit its location, as determined by the navigation module from received GPS signals, to the server 150 using, for example, an integral or connected mobile communications device (such as a mobile telephone or a telephony equipped PDA).

In an alternate arrangement the approximate location of the navigation device could be determined by means of conventional triangulation techniques that enable the approximate location of a mobile telephone to be calculated based on its communications with mobile transceiver stations of the mobile telephone network.

In either case, the server could be configured to implement a pseudo-real time system by sending user requests, for example by means of a mobile communications device that forms part of or to which the device is connect, to a selection of those navigation devices that are currently in the vicinity of a location that is associated with a reported need for map data correction.

In a particularly preferred implementation for any of the aforementioned embodiments, the navigation devices could be preloaded with form data for different types of user request, and in such an arrangement the user requests transmitted by the server (for example in cooperation with a mobile telephone network) need only comprise unique data pertaining to the particular correction being investigated at that time.

Figure 25:
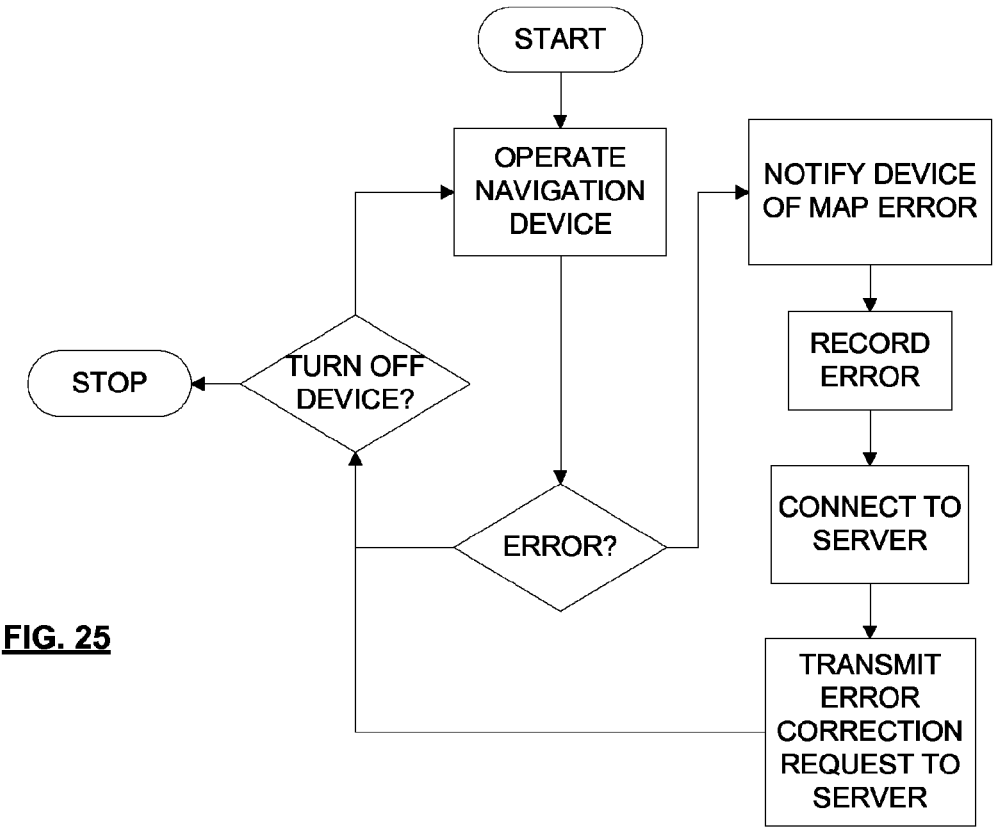
FIGS. 25 and 26 provide an overview in flow chart form of an illustrative embodiment of the invention.
Figure 26:
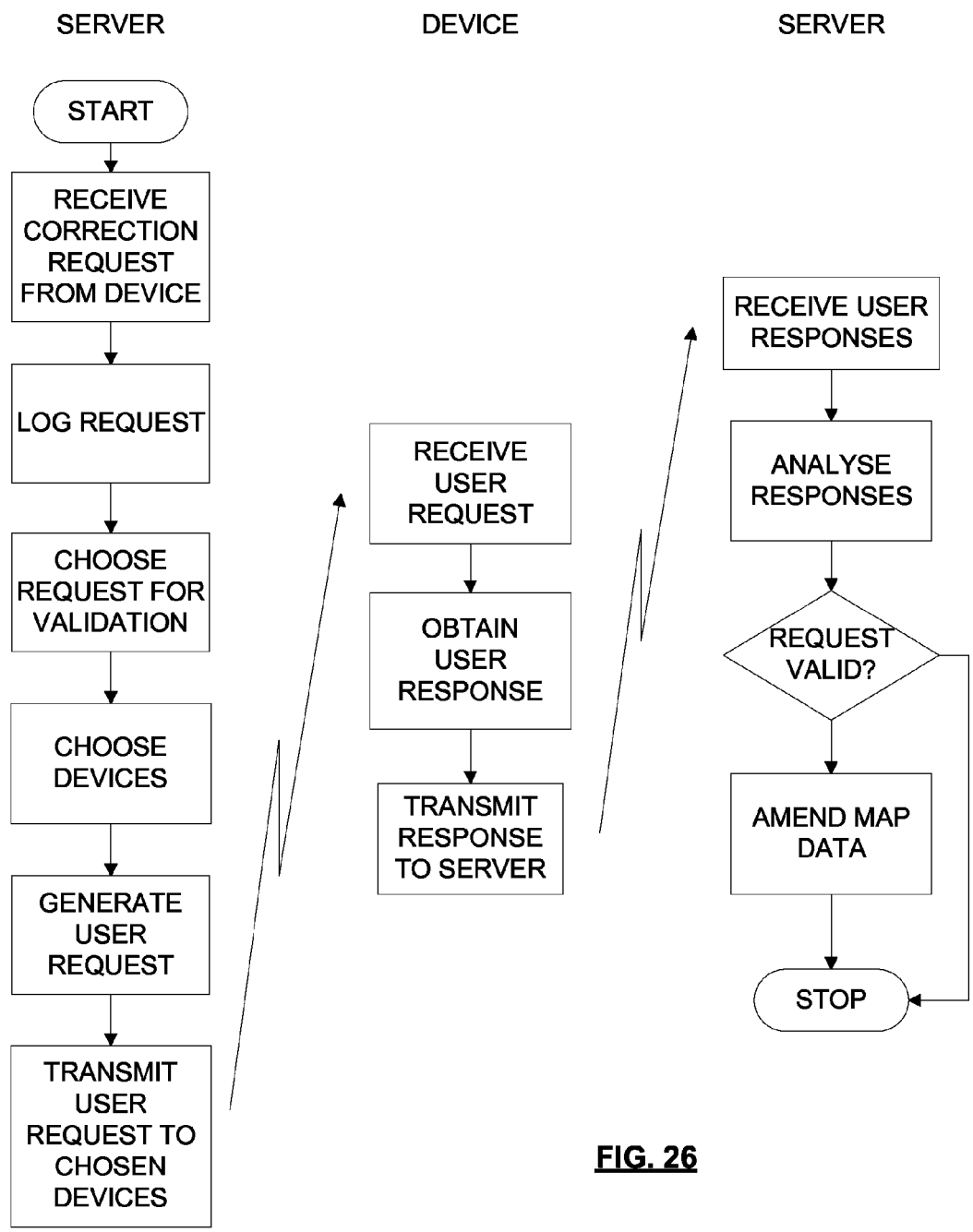

Referring now to FIGS. 25 and 26, there are shown in the form of flow diagrams the various functional steps in the process of flagging map data as needing correction, and subsequently enlisting the help of users in validating a requested correction.

Referring firstly to FIG. 25, in a first step the user switches on their navigation device and operates it either as a route guidance tool or in a free-driving mode. If the user should notice an error in the map data whilst using the device, the user can notify the device of the error, whereupon the device liaises with the user to determine the type of error noted, the correction required and the location that the error is associated with records the error as a correction request in the device.

When the device connects with the server, for example when the device is next coupled to the device via an internet or immediately if the device is connected to the server whilst being operated, the device transmits the error correction request to the server.

Referring now to FIG. 26, on receipt of a correction request from a device the server stores the request in the correction request store. The server selects a request for validation by users, selects the set of devices that are to be asked to assist with validation of the correction request, and generates a user request for transmission to the selected user devices (for example when those devices are next connected to the server). In due course the generated user requests are transmitted to the selected devices.

The devices receive the transmitted user requests, and obtain a response from the user in the manner aforementioned. The responses are then transmitted back to the server for processing.

The server receives the user responses from the navigation devices, analyses the responses received, and determines whether the responses indicate that the requested correction is valid. If the requested correction is determined to be valid, the map data is amended accordingly and the process ceases. If the requested correction is not determined to be valid, processing ceases.

It will be appreciated from the foregoing that the teachings of the present invention provide a powerful means for validating requested corrections to map data in a navigation system. The arrangements disclosed avoid much of the expense associated with traditional methods of validating correction requests, and facilitate a quicker respond to noted errors. Furthermore, in preferred embodiments of the invention it is significantly harder for nefarious individuals to pollute the map data with incorrect submissions.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

In addition to the foregoing, whilst the present application has hitherto described the validation of corrections suggested by users, it will be appreciated that the teachings of the present invention may equally well be employed in the validation of any proposed map data changes—not merely those that are mooted in response to a user request. Similarly, whilst the foregoing has described the transmission of user requests to a plurality of users, it will be appreciated that many of the benefits of the present technique could be enjoyed if only a single request were to be transmitted to a single navigation device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A system for use in the validation of a correction, by a navigation device user, to map data for a geographic location, the system comprising:
 a processing resource; and
 a navigation device,
 wherein the processing resource comprises:
  a user request generator that is configured to generate a user request for transmission to the navigation device, wherein the user request is a request for assistance from the navigation device user in the validation of the correction;
  a transmitter for transmitting the generated user request to the navigation device; and
  a receiver for receiving a user response from said navigation device, and wherein the navigation device comprises:
  a receiver for receiving the user request transmitted from the processing resource;
  a user request module configured to present said received user request to a user of the navigation device;
  a user response module for capturing a user response to said presented user request, and
  a transmitter for transmitting said captured user response to said processing resource.

2. A system according to claim 1, wherein the user request includes position information defining one or more geographic locations at which said user request module presents said user request to said user.

3. A system according to claim 2, wherein the navigation device includes a navigation module configured to determine the geographic position of the navigation device, and said user request module is configured to present said user request to the user when said navigation module indicates that the geographic location of said navigation device is included in said position information.

4. A system according to claim 3, wherein said position information defines a zone that is a predetermined distance from the location associated with said geographic location.

5. A system according to claim 4, wherein said predetermined distance varies in accordance with the type of correction that is to be validated.

6. A system according to claim 1, wherein said user request generator is configured to generate a plurality of user requests, each for transmission to a different navigation device.

7. A system according to claim 6, wherein said processing resource comprises a device selection module operable to select navigation devices to which generated user requests are to be transmitted.

8. A system according to claim 7, wherein said processing resource comprises a route log configured to store navigation routes traveled by navigation devices.

9. A system according to claim 7, wherein said device selection module is configured to select a set of devices for which a route is stored in said route log that includes a location in the vicinity of the geographic location associated with said correction.

10. A system according to claim 9, wherein said device selection module is configured to select a set of devices for which a route is stored in said route log that includes the geographic location associated with said correction.

11. A system according to claim 9, wherein said device selection module is configured to randomly select a set of devices from a plurality of devices for each of which a route is stored in said route log that includes a location in the vicinity of the geographic location associated with said correction.

12. A system according to claim 1, wherein the processing resource comprises a response review module for analyzing user responses to validate said correction.

13. A system according to claim 1, wherein said user request module is configured to present said user request by playing an audio message to said user.

14. A system according to claim 1, wherein said user request module is configured to present said user request by displaying a visual message to said user.

15. A method for use in the validation of a correction, by a navigation device user, to map data for a geographic location, the method comprising:
   generating a user request for transmission from a processing resource to a navigation device, wherein the user request is a request for assistance from the navigation device user in the validation of the correction;
   transmitting the generated user request to the navigation device;
   controlling the navigation device to present the user request to a user of the navigation device;
   capturing a user response to said presented user request; and
   transmitting the user response to said processing resource.

16. A method according to claim 15, further comprising analyzing said user response to validate said correction.

17. A computer program, embodied on a non-transitory computer readable medium, comprising one or more computer program modules configured, when executed by a processor resource, to cause the processor resource to implement a method as defined in claim 15.

18. A method for use in the validation of a correction, by a navigation device user, to map data for a geographic location, the method comprising:
   generating a user request for transmission from a processing resource to a navigation device, wherein the user request is a request for assistance from the navigation device user in the validation of the correction;
   transmitting the generated user request to the navigation device for presentation of the user request to a user of the navigation device; and
   receiving from a navigation device a user response to a presented user request.

19. A method for use in the validation of a correction, by a navigation device user, to map data for a geographic location, the method comprising:
   receiving, at a navigation device, a user request transmitted from a processing resource, wherein the user request is a request for assistance from the navigation device user in the validation of the correction;
   controlling the navigation device to present the user request to a user of the device;
   capturing a user response to said presented request; and
   transmitting said user response to said processing resource.

20. A processing resource configured for use in a system for use in the validation of a correction, by a navigation device user, to map data for a geographic location, the system comprising a navigation device that includes a receiver for receiving user requests transmitted from the processing resource, a user request module configured to present a received user request to the navigation device user, a user response module for capturing a user response to said presented user request, and a transmitter for transmitting said captured user response to said processing resource; the processing resource comprising:
   a user request generator that is configured to generate a user request for transmission to the navigation device, wherein the user request is a request for assistance from the navigation device user in the validation of the correction;
   a transmitter for transmitting the generated user request to the navigation device; and
   a receiver for receiving the user response from said navigation device.

21. A navigation device configured for use in a system for use in the validation of a correction, by a navigation device user, to map data for a geographic location, the system comprising a processing resource that includes a user request generator that is configured to generate a user request for transmission to the navigation device, a transmitter for transmitting the generated user request to the navigation device, and a receiver for receiving from said navigation device a user response to a user request presented to a user of said navigation device; the navigation device comprising:
   a receiver for receiving the user request transmitted from the processing resource, wherein the user request is a request for assistance from the navigation device user in the validation of the correction;
   a user request module configured to present said received user request to a user of the navigation device;
   a user response module for capturing the user response to said presented user request, and
   a transmitter for transmitting said captured user response to said processing resource.

* * * * *